US011173896B2

(12) United States Patent
Seimiya et al.

(10) Patent No.: US 11,173,896 B2
(45) Date of Patent: Nov. 16, 2021

(54) PARKING ASSISTANCE DEVICE (71) Applicant: HITACHI AUTOMOTIVE SYSTEMS, LTD., Ibaraki (JP)

(72) Inventors: Masashi Seimiya, Hitachinaka (JP); Yoshiyuki Yoshida, Hitachinaka (JP); Munetoshi Tsuge, Hitachinaka (JP); Keiichiro Hirakawa, Hitachinaka (JP)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 147 days.

(21) Appl. No.: 16/622,148

(22) PCT Filed: Apr. 26, 2018

(86) PCT No.: PCT/JP2018/016923
§ 371 (c)(1),
(2) Date: Dec. 12, 2019

(87) PCT Pub. No.: WO2018/230175
PCT Pub. Date: Dec. 20, 2018

(65) Prior Publication Data
US 2020/0122718 A1 Apr. 23, 2020

(30) Foreign Application Priority Data
Jun. 16, 2017 (JP) .............................. JP2017-118907

(51) Int. Cl.
B60W 30/06 (2006.01)
B60W 40/09 (2012.01)
B60W 40/105 (2012.01)
(52) U.S. Cl.
CPC ............ B60W 30/06 (2013.01); B60W 40/09 (2013.01); B60W 40/105 (2013.01); B60W 2510/18 (2013.01)

(58) Field of Classification Search
CPC .... B60W 30/06; B60W 40/09; B60W 40/105; B60W 2510/18
See application file for complete search history.

(56) References Cited

U.S. PATENT DOCUMENTS

2010/0036562 A1* 2/2010 Becker .................. B60W 30/16
701/41
2016/0068158 A1* 3/2016 Elwart .................. B60W 50/10
701/41

FOREIGN PATENT DOCUMENTS

EP 2159121 A1 3/2010
JP 2010-501394 A 1/2010
(Continued)

OTHER PUBLICATIONS

Extended European Search Report dated Nov. 25, 2020 for European Patent Application No. 18817660.6.
(Continued)

Primary Examiner — Aniss Chad
Assistant Examiner — Elijah W. Vaughan
(74) Attorney, Agent, or Firm — Volpe Koenig (57) ABSTRACT Provided is a parking assistance device capable of reducing inconvenience felt by a driver experienced in automatic parking control during parking at a target vehicle speed corrected to a lower speed at a start of use of automatic parking control, for example. The parking assistance device controls a vehicle speed of the vehicle during parking to assist parking of the vehicle. The parking assistance device increases the vehicle speed of the vehicle during parking in accordance with a behavior during parking or from previous parking of the vehicle.

12 Claims, 12 Drawing Sheets (56) References Cited

FOREIGN PATENT DOCUMENTS

| | | |
|---|---|---|
| JP | 2013-82376 A | 5/2013 |
| JP | 2014-24462 A | 2/2014 |
| JP | 2016-150593 A | 8/2016 |

OTHER PUBLICATIONS

International Search Report for PCT/JP2018/016923 A1, dated Aug. 14, 2018.

* cited by examiner

| PARKING METHOD | | PARKING AREA ADJACENT OBSTACLE | PARKING PATTERN PTNPA |
|---|---|---|---|
| PARALLEL | HEAD FIRST | NONE | PATTERN 1 |
| | | PRESENT ON ONE SIDE | PATTERN 2 |
| | | PRESENT ON BOTH SIDES | PATTERN 3 |
| | TAIL FIRST | NONE | PATTERN 4 |
| | | PRESENT ON ONE SIDE | PATTERN 5 |
| | | PRESENT ON BOTH SIDES | PATTERN 6 |
| TANDEM | HEAD FIRST | NONE | PATTERN 7 |
| | | PRESENT ON ONE SIDE | PATTERN 8 |
| | | PRESENT ON BOTH SIDES | PATTERN 9 |
| | TAIL FIRST | NONE | PATTERN 10 |
| | | PRESENT ON ONE SIDE | PATTERN 11 |
| | | PRESENT ON BOTH SIDES | PATTERN 12 |
| OBLIQUE | HEAD FIRST | NONE | PATTERN 13 |
| | | PRESENT ON ONE SIDE | PATTERN 14 |
| | | PRESENT ON BOTH SIDES | PATTERN 15 |
| | TAIL FIRST | NONE | PATTERN 16 |
| | | PRESENT ON ONE SIDE | PATTERN 17 |
| | | PRESENT ON BOTH SIDES | PATTERN 18 |

| PARKING PATTERN PTNPA | INCREASE AMOUNT DTVspLMT |
|---|---|
| PATTERN 1 | INCREASE AMOUNT 1 |
| PATTERN 2 | INCREASE AMOUNT 2 |
| PATTERN 3 | INCREASE AMOUNT 3 |
| PATTERN 4 | INCREASE AMOUNT 4 |
| PATTERN 5 | INCREASE AMOUNT 5 |
| PATTERN 6 | INCREASE AMOUNT 6 |
| PATTERN 7 | INCREASE AMOUNT 7 |
| PATTERN 8 | INCREASE AMOUNT 8 |
| PATTERN 9 | INCREASE AMOUNT 9 |
| PATTERN 10 | INCREASE AMOUNT 10 |
| PATTERN 11 | INCREASE AMOUNT 11 |
| PATTERN 12 | INCREASE AMOUNT 12 |
| PATTERN 13 | INCREASE AMOUNT 13 |
| PATTERN 14 | INCREASE AMOUNT 14 |
| PATTERN 15 | INCREASE AMOUNT 15 |
| PATTERN 16 | INCREASE AMOUNT 16 |
| PATTERN 17 | INCREASE AMOUNT 17 |
| PATTERN 18 | INCREASE AMOUNT 18 |

PARKING ASSISTANCE DEVICE

TECHNICAL FIELD

The present invention relates to a parking assistance device, and more particularly to a parking assistance device which controls a speed of a vehicle during parking of the vehicle in a parking space.

BACKGROUND ART

A feeling of safety of a driver concerning a vehicle speed differs for each driver depending on an environment around the vehicle (presence or absence of obstacle), a driving experience of the driver, and others during automatic parking control for controlling acceleration, braking, steering and the like. As a conventional technology of this type, there is a known method which reduces a target vehicle speed of a vehicle during automatic parking in accordance with a distance between an obstacle and the vehicle at the time of input of a brake operation from a driver, as described in PTL 1, for example.

CITATION LIST

Patent Literature

PTL 1: JP 2016-150593 A

SUMMARY OF INVENTION

Technical Problem

However, a feeling of anxiety concerning the vehicle speed decreases as the driver is more experienced in automatic parking. Accordingly, the driver may rather feel inconvenience when parking at a vehicle speed upper limit which is a corrected target vehicle speed to a lower speed in a manner described in PTL 1.

The present invention has been developed in view of the aforementioned problems. It is an object of the present invention to provide a parking assistance device capable of reducing inconvenience felt by a driver experienced in automatic parking control during parking at a target vehicle speed corrected to a lower speed at a start of use of automatic parking control, for example.

Solution to Problem

For solving the above problems, there is provided a parking assistance device for controlling a vehicle speed of a vehicle during parking to assist parking of the vehicle, characterized in that a vehicle speed of the vehicle during parking is increased in accordance with a behavior during parking or from previous parking of the vehicle.

Advantageous Effects of Invention

According to the present invention, inconvenience felt by a driver experienced in automatic parking control can be reduced during parking at a target vehicle speed of a vehicle corrected to a lower speed at a start of use of automatic parking control, for example.

Problems, configurations, and effects other than those described above will be apparent from following description of embodiments.

DESCRIPTION OF EMBODIMENTS

Embodiments of the present invention will be hereinafter described with reference to the drawings.

Each of the following embodiments to be described is divided into a plurality of sections or implementation examples as necessary for convenience. The respective sections and implementation examples are related to each other unless otherwise specified. One of the sections and implementation examples correspond a modified example, details, supplementary explanation and the like of a part or all of the others.

First Embodiment

A parking assistance device according to a first embodiment of the present invention will be initially described with reference to FIGS. 1 to 12.

Figure 1:
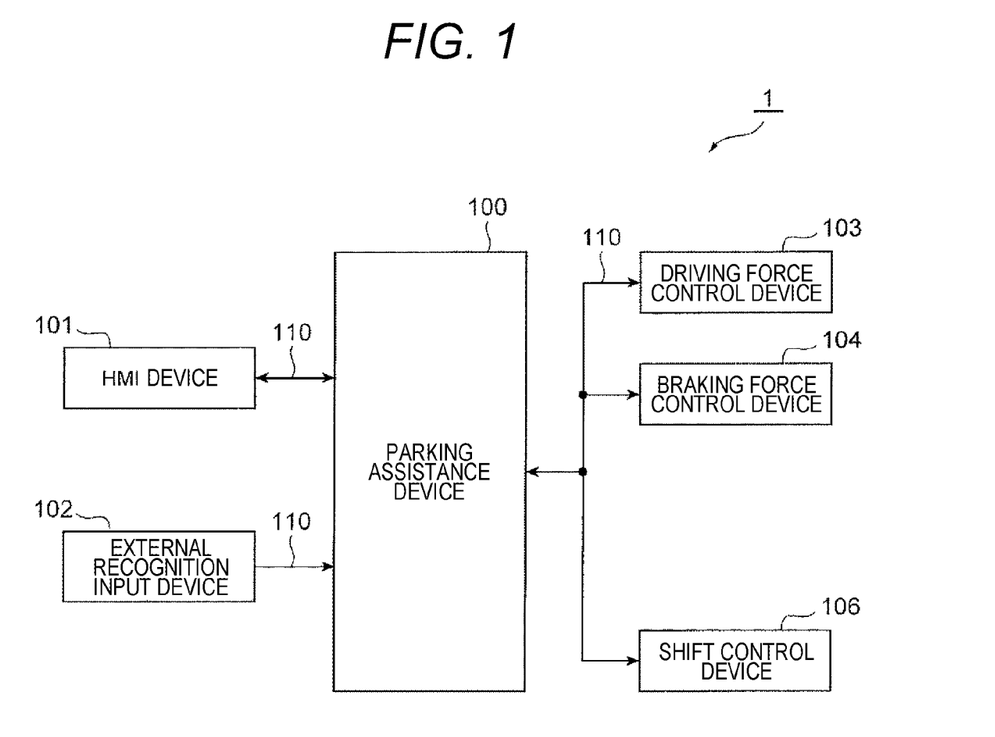
FIG. 1 is a diagram showing a schematic configuration of an automatic parking system including a parking assistance device according to a first embodiment of the present invention.

A schematic configuration of an automatic parking system including a parking assistance device according to the first embodiment of the present invention will be first described with reference to FIG. 1. An automatic parking system 1 chiefly includes a parking assistance device 100, a human machine interface (HMI) device 101 for display, an external recognition input device 102 including a camera, a sonar, a radar or the like, a driving force control device 103 including an engine, a motor or the like, a braking force control device 104 including a brake or the like, and a shift control device 106 for forward-backward switching. These components are communicably connected to each other via a communication means 110 such as a controller area network (CAN). The respective devices are related to each other such that information associated with the parking assistance device 100 is output to the HMI device 101, the driving force control device 103, the braking force control device 104, and the shift control device 106, and that information associated with the HMI device 101, the external recognition input device 102, the driving force control device 103, the braking force control device 104, and the shift control device 106 is output to the parking assistance device 100.

Figure 2:
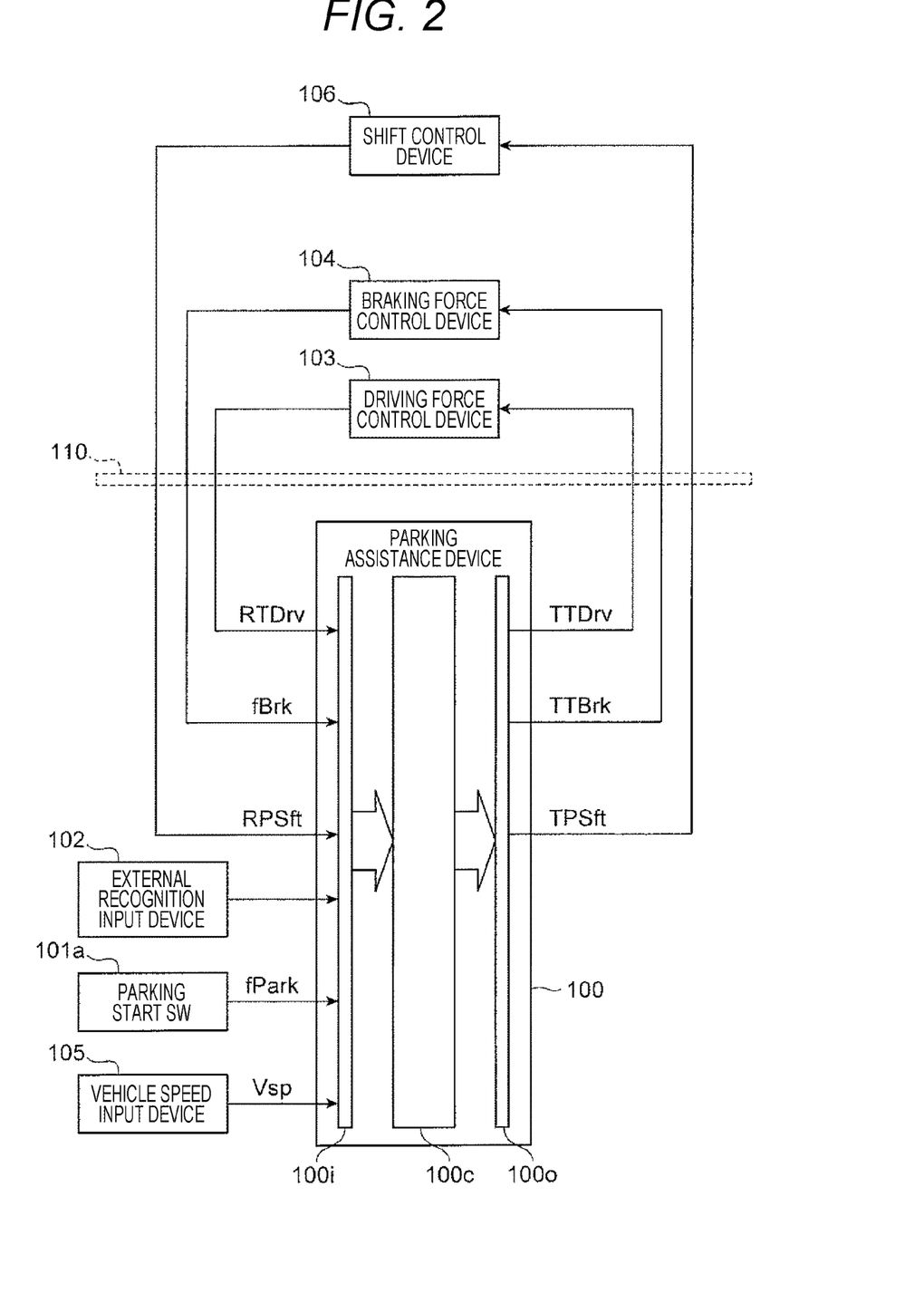
FIG. 2 is a block diagram showing an input/output signal relationship of the parking assistance device, a driving force control device, a braking force control device, and a shift control device shown in FIG. 1.

Specifically, as shown in FIG. 2, outputs from the external recognition input device 102, the driving force control device 103, the braking force control device 104, and the shift control device 106 are input to an input unit 100i of the parking assistance device 100, and output to the driving force control device 103, the braking force control device 104, and the shift control device 106 via a computer 100c as a central processing unit and an output unit 100o. Note that not only detection information associated with a parking area, adjacent obstacles and the like and obtained by the external recognition input device 102, but also information associated with a parking start SW 101a for starting parking assistance, and information associated with a vehicle speed obtained from a vehicle speed input device 105 such as a vehicle speed sensor are input to the input unit 100i of the parking assistance device 100. The parking assistance device 100 controls a vehicle speed of the corresponding vehicle during parking by controlling a driving force at the driving force control device 103 and a braking force at the braking force control device 104 based on these information.

An outline of entire vehicle speed control during vehicle parking performed by the parking assistance device 100 shown in FIG. 1 will be next described with reference to a flowchart in FIG. 3.

It is initially determined whether or not a current mode is a parking assistance mode based on the information associated with the parking start SW 101a (S301). When it is determined that the current mode is the parking assistance mode, parking assistance vehicle speed control is performed (S302). When it is determined that the current mode is not the parking assistance mode, existing vehicle speed control is performed (S303). The control flow is programmed in the computer 100c of the parking assistance device 100, and repeatedly executed in a predetermined cycle.

An outline of a parking assistance vehicle speed control process (S302) shown in FIG. 3 will be next described with reference to a flowchart in FIG. 4.

In the parking assistance vehicle speed control process (S302), a parking pattern PTNPA is acquired from the information obtained by the external recognition input device 102 and the like (see FIG. 5 for details) (S401). Thereafter, an actual vehicle speed Vsp is obtained from the information obtained by the vehicle speed input device 105 (S402). After a target vehicle speed TVsp is calculated (S403), a target driving force and a target braking force are calculated (S404). As shown in FIG. 5, a plurality of patterns constituted by combinations of a parking method and a parking area adjoining obstacle are set for the parking pattern PTNPA. The parking pattern PTNPA is acquired based on these patterns.

Figure 4:
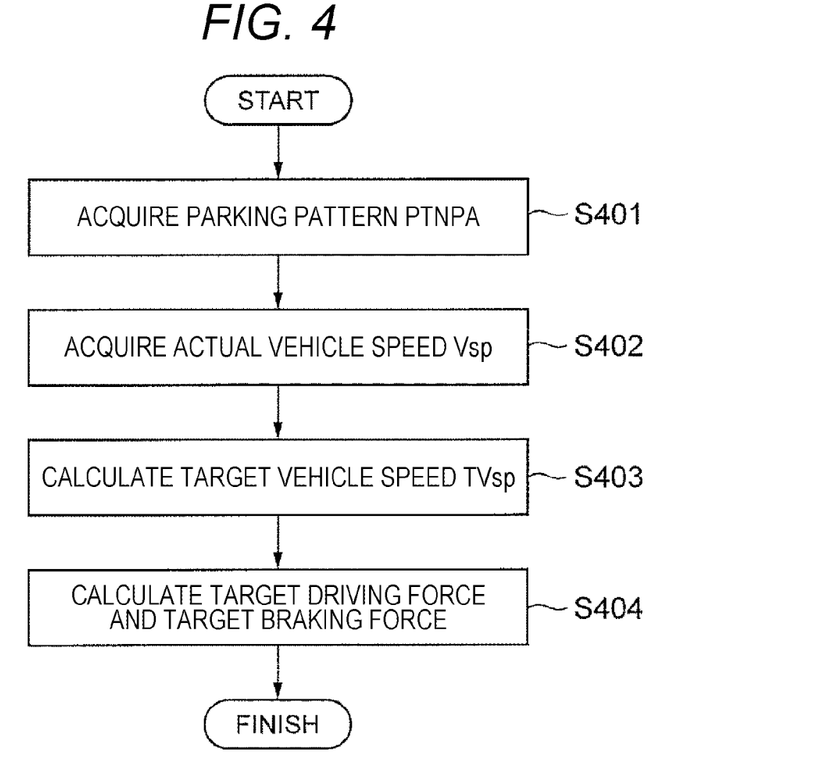
FIG. 4 is a flowchart schematically showing a parking assistance vehicle speed control process shown in FIG. 3.
Figure 5:
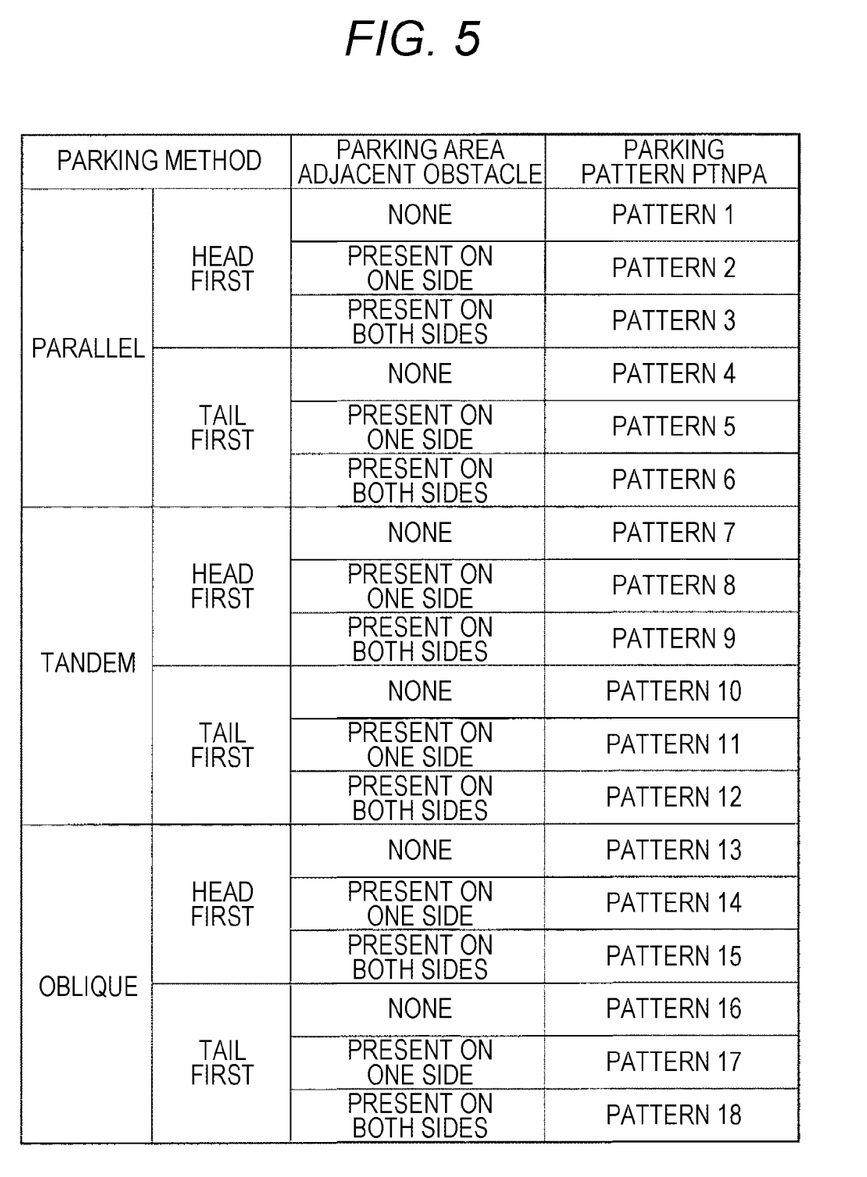
FIG. 5 is a table schematically showing a parking pattern acquisition process shown in FIG. 4.
Figure 6:
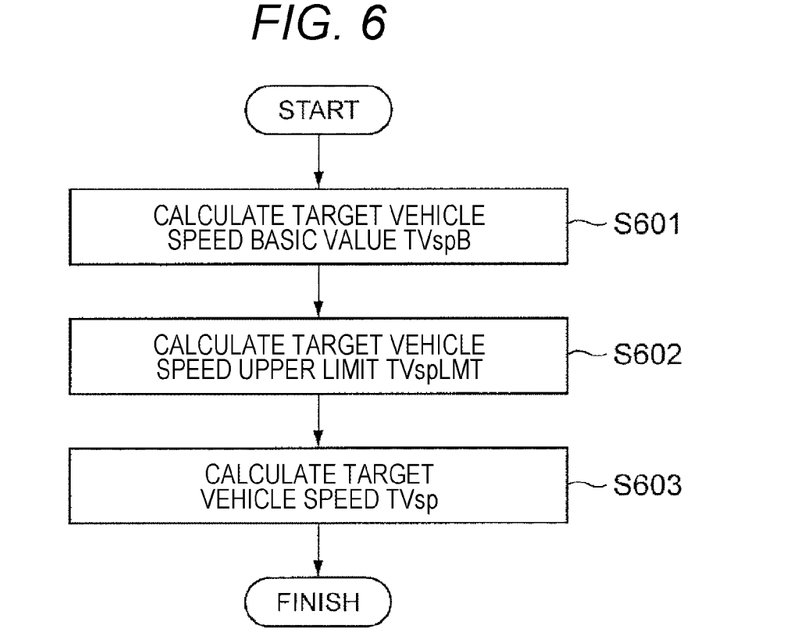
FIG. 6 is a flowchart schematically showing a target vehicle speed calculation process shown in FIG. 4.

In a target vehicle speed calculation process (S403) shown in FIG. 4, a target vehicle speed basic value TVspB is initially calculated (S601) as shown in a flowchart of FIG. 6. Thereafter, a target vehicle speed upper limit TVspLMT is calculated (S602), and a target vehicle speed TVsp corresponding to the target vehicle speed basic value TVspB and the target vehicle speed upper limit TVspLMT is calculated (S603).

Figure 7:
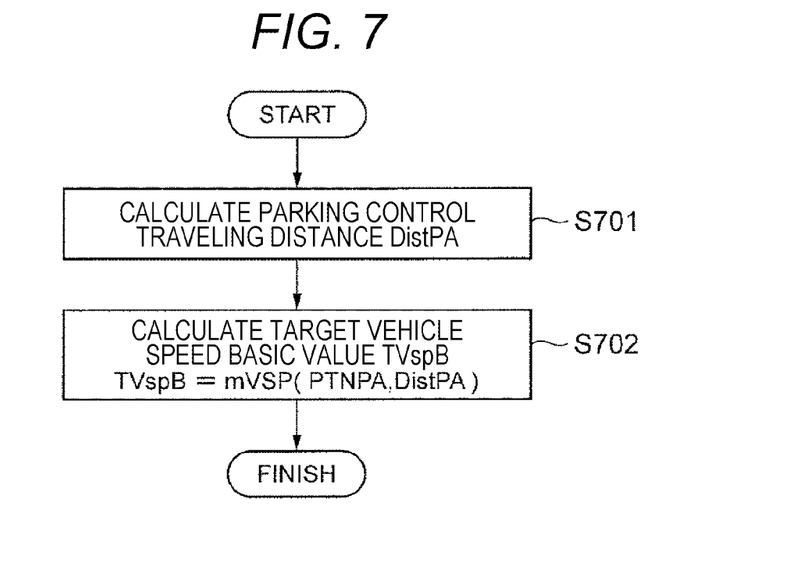
FIG. 7 is a flowchart schematically showing a target vehicle speed basic value calculation process shown in FIG. 6.
Figure 8:
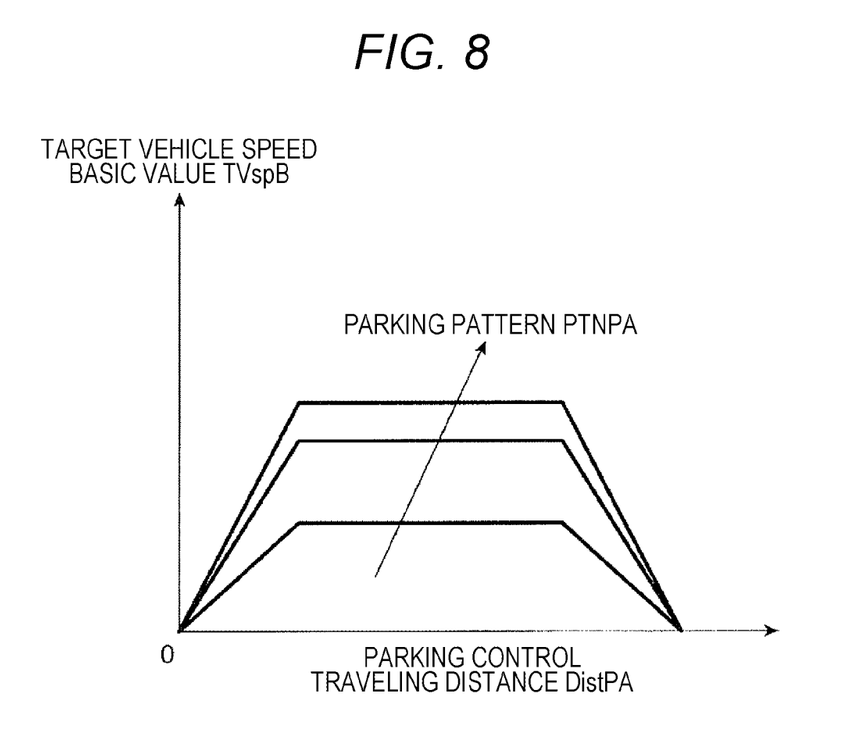
FIG. 8 is a calculation map for calculating a target vehicle speed basic value.

As shown in a flowchart in FIG. 7, in the calculation process (S601) of the target vehicle speed basic value TVspB, a parking control traveling distance DistPA is first calculated (S701), and the target vehicle speed basic value TVspB is determined from the parking control traveling distance DistPA (S702). The relationship between the target vehicle speed basic value TVspB and the parking control travel distance DistPA is variable in accordance with the parking pattern PTNPA, as shown in FIG. 8, for example.

Figure 9:
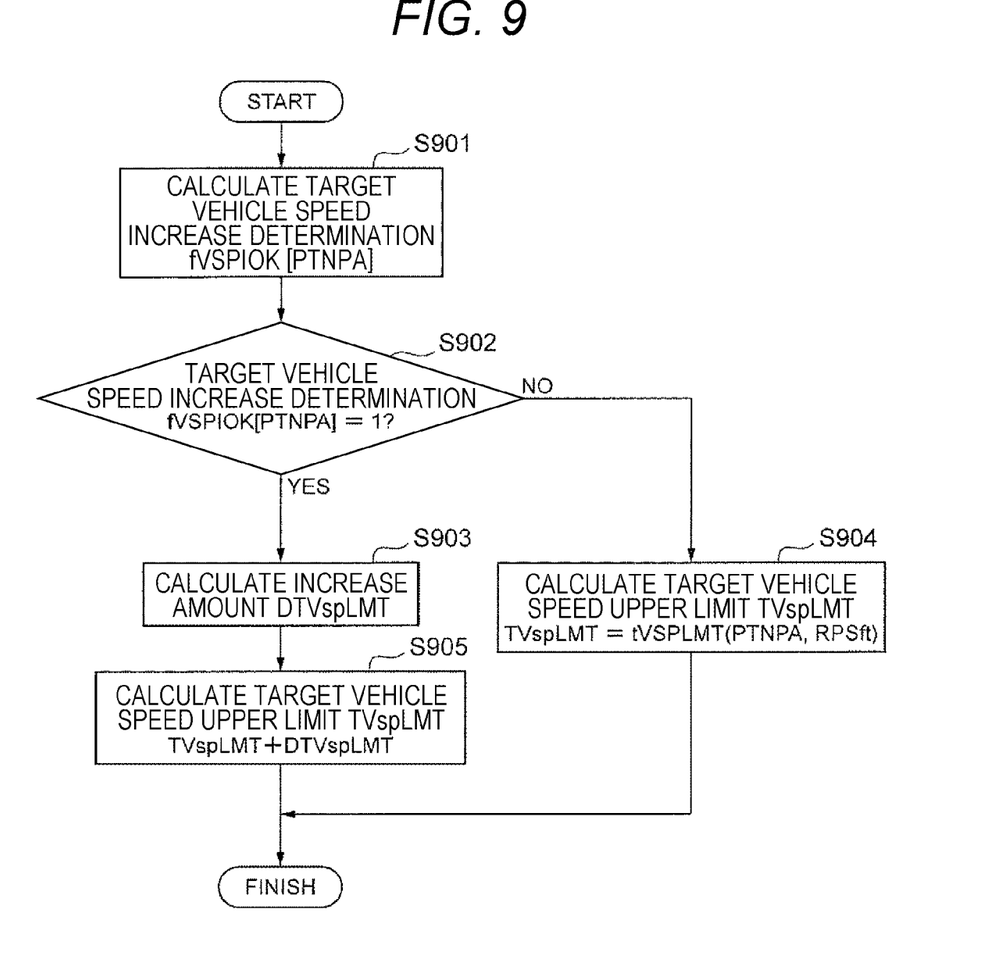
FIG. 9 is a flowchart schematically showing a target vehicle speed upper limit calculation process shown in FIG. 6.

In the calculation process of the target vehicle speed upper limit TVspLMT (S602), a target vehicle speed increase determination fVSPIOK [PTNPA] is initially calculated (S901) as shown in the flowchart of FIG. 9. When it is determined that a target vehicle speed increase is necessary based on a result of the calculation (S902), an increase amount DTVspLMT is calculated (S903). Thereafter, the target vehicle speed upper limit TVspLMT is corrected and set to such a value obtained by adding the increase amount DTVspLMT to the reference target vehicle speed upper limit TVspLMT obtained based on the parking pattern PTNPA, the information obtained from the shift control device 106, and others (S905). When NO in the target vehicle speed increase determination (S902), the reference target vehicle speed upper limit TVspLMT is retained (S904).

Figure 10:
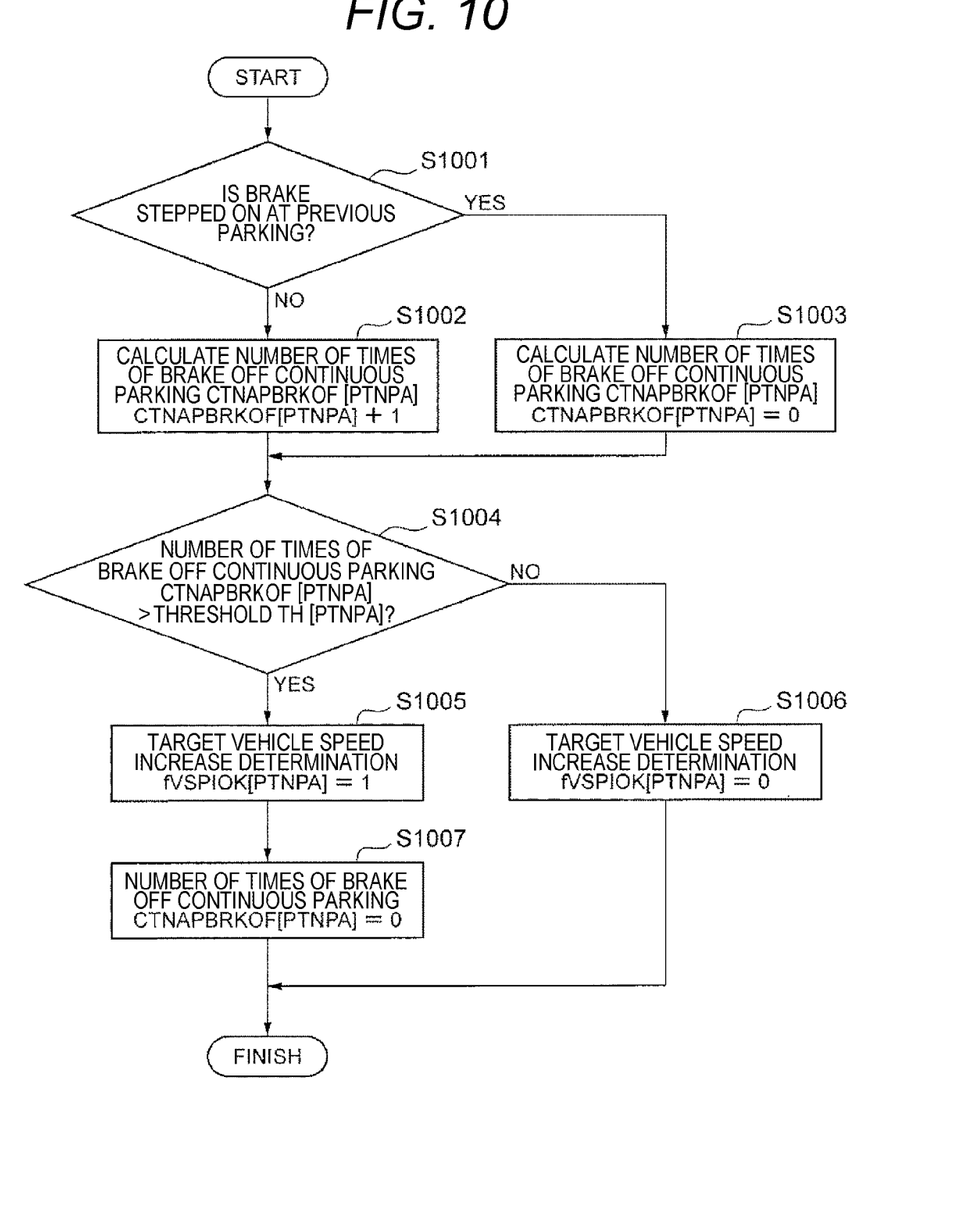
FIG. 10 is a flowchart schematically showing a target vehicle speed increase determination calculation process shown in FIG. 9.

The calculation process (S901) of the target vehicle speed increase determination fVSPIOK [PTNPA] shown in FIG. 9 will be more specifically described with reference to a flowchart in FIG. 10.

In the calculation process (S901) of the target vehicle speed increase determination fVSPIOK [PTNPA], it is initially determined whether or not a driver has stepped on the brake in previous parking (i.e., whether or not brake operation has been performed by the driver in previous parking) (S1001) to obtain a number of times of brake OFF continuous parking CTNAPBRKOF [PTNPA], which is a number of times of parking continuously performed without the brake operation (S1002). Note that the number of times of brake OFF continuous parking CTNAPBRKOF [PTNPA] is set to 0 (S1003) when it is determined that the brake has been stepped on by the driver during previous parking (i.e., brake operation has been performed by the driver in previous parking). The number of times of the brake OFF continuous parking CTNAPBRKOF [PTNPA] herein is obtained for each of the parking patterns PTNPA. When the number of times of brake OFF continuous parking CTNAPBRKOF [PTNPA] exceeds a certain threshold TH [PTNPA] (i.e., when the driver continuously performs parking a predetermined number of times without the brake operation in a period until previous parking) (S1004), a target vehicle speed increase determination flag is set (i.e., the target vehicle speed increase determination fVSPIOK [PTNPA] is set to 1) (S1005). Thereafter, the number of times of brake OFF continuous parking CTNAPBRKOF [PTNPA] is reset (S1007), and the process finishes. In a case of no excess of the threshold TH [PTNPA] (S1004), the process finishes without setting the target vehicle speed increase determination flag (i.e., the target vehicle speed increase determination fVSPIOK [PTNPA] is set to 0) (S1006), and the process finishes without change. The threshold TH [PTNPA] described above is changed in accordance with the parking pattern PTNPA similarly to the number of times of brake OFF continuous parking CTNAPBRKOF [PTNPA].

Figure 11:
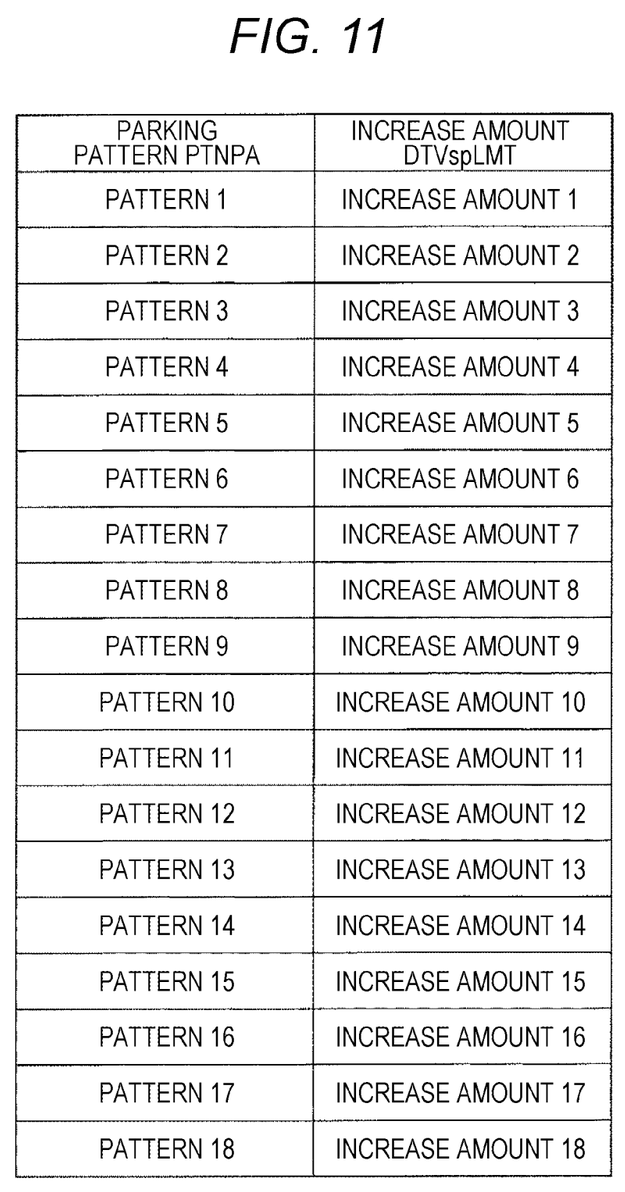
FIG. 11 is a calculation map for calculating a target vehicle speed increase amount.

The calculation process of the increase amount DTVspLMT shown in FIG. 9 (S903), that is, the calculation process of the increase amount DTVspLMT at the time of increase in the target vehicle speed TVsp will be next described with reference to FIG. 11. As shown in FIG. 11, the increase amount DTVspLMT is set in accordance with the parking pattern PTNPA. The increase amount DTVspLMT is appropriately determined using this map. Accordingly, an appropriate value of the target vehicle speed upper limit TVspLMT is calculated in the calculation process of the target vehicle speed basic value TVspB (S601).

Figure 3:
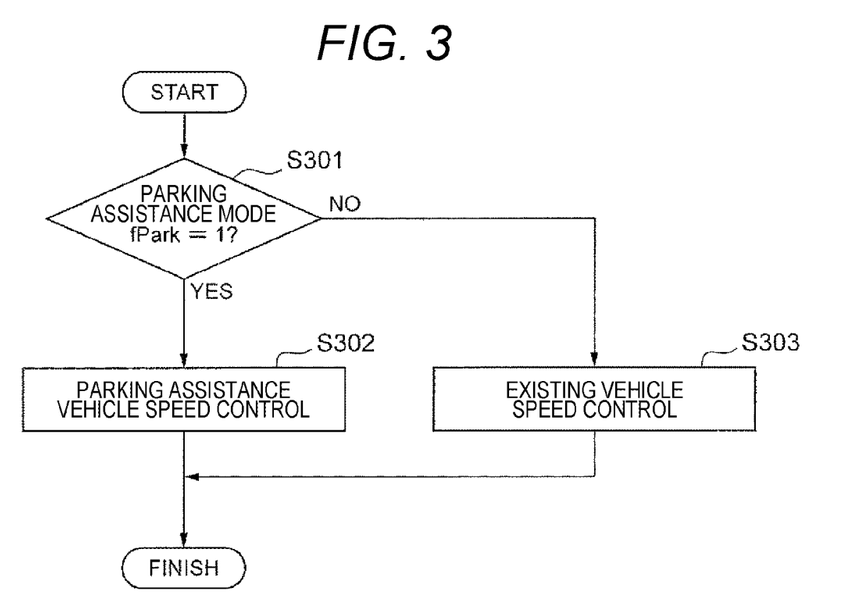
FIG. 3 is a flowchart schematically showing overall control contents of a control method performed by the parking assistance device shown in FIG. 1.

By executing the above processes, appropriate values of the target vehicle speed basic value TVspB and the target vehicle speed upper limit TVspLMT are calculated in the parking assistance vehicle speed control process (S302) shown in FIG. 3, and an appropriate value of target vehicle speed TVsp corresponding to the parking pattern PTNPA and a behavior during parking is calculated based on the target vehicle speed basic value TVspB and the target vehicle speed upper limit TVspLMT.

Figure 12:
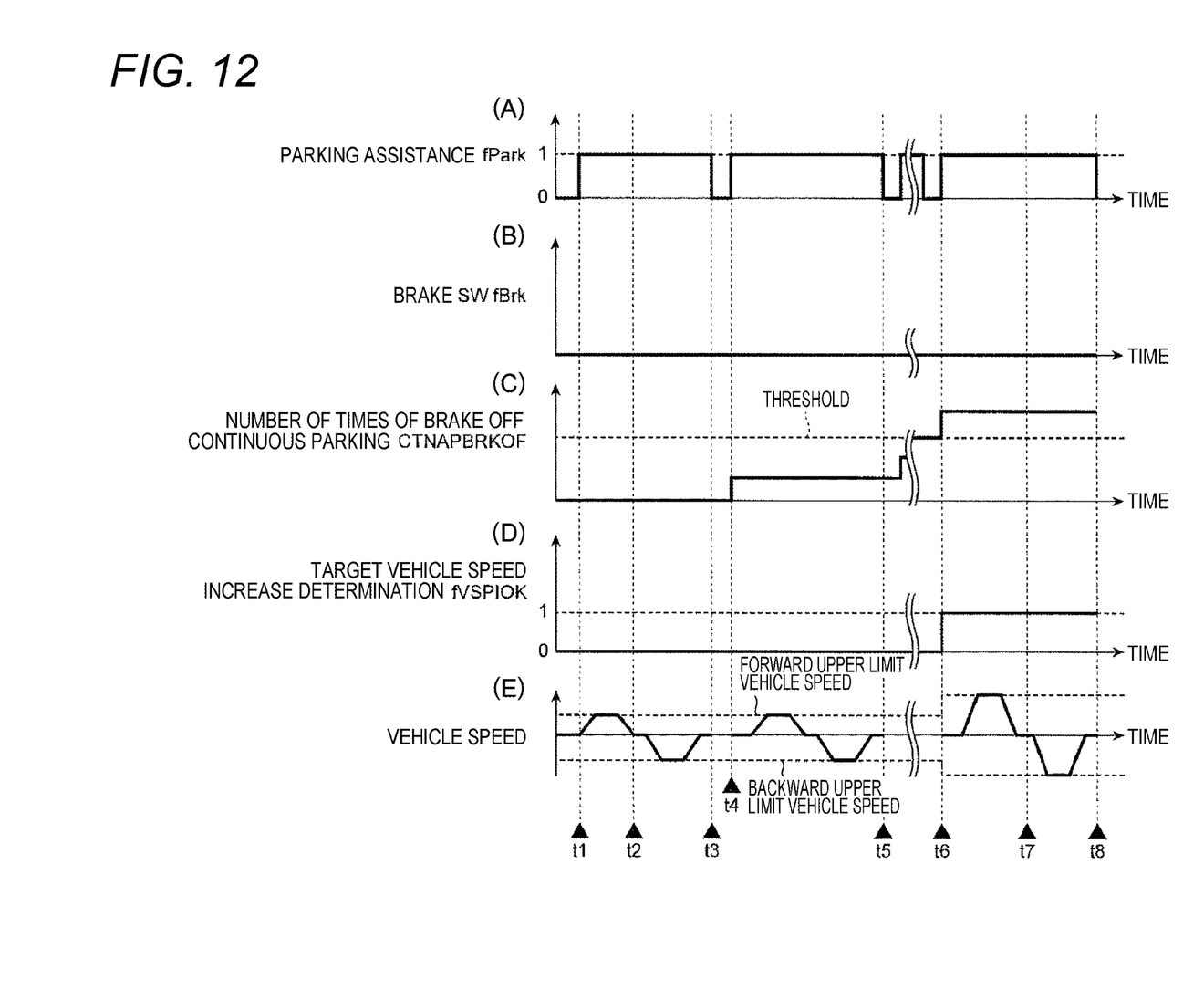
FIG. 12 is a time chart showing an operation during vehicle parking performed by the parking assistance device shown in FIG. 1.

An operation during vehicle parking performed by the parking assistance device 100 shown in FIG. 1 will be next described with reference to a time chart in FIG. 12. A part (A) in an uppermost stage shows parking assistance timing, while a part (B) shows a state of the brake SW at corresponding timing. When no brake operation is performed during a parking assistance period from t1 to t3, the number of times of brake OFF continuous parking CTNAPBRKOF [PTNPA] is counted up as shown in a part (C) at subsequent parking assistance start timing t4. Thereafter, at parking assistance t6 when the number of times of brake OFF continuous parking CTNAPBRKOF [PTNPA] exceeds the threshold TH [PTNPA], the target vehicle speed increase determination flag is set as shown in a part (D) (i.e., the target vehicle speed increase determination fVSPIOK [PTNPA]becomes 1). In this case, an upper limit vehicle speed (forward upper limit speed, backward upper limit speed) is increased and set as shown in a part (E). As a result, the vehicle speed of the corresponding vehicle during parking increases. In the example shown in FIG. 12, the vehicle speed of the corresponding vehicle during parking generally increases. Needless to say, the manner of the increase in the vehicle speed of the corresponding vehicle during parking is not limited to this example. In addition, needless to say, the forward upper limit speed and the backward upper limit speed may be individually set in an appropriate manner.

According to the present embodiment, as described above, the upper limit vehicle speed (target vehicle speed upper limit) is changed (increased and set) based on an experience of the automatic parking control even after the target vehicle speed of the vehicle is corrected to a lower speed at a start of use of the automatic parking control. In this manner, inconvenience felt by the driver experienced in the automatic parking control can be reduced by increasing the vehicle speed of the vehicle during parking.

Second Embodiment

A parking assistance device according to a second embodiment of the present invention will be next described with reference to FIG. 13. Described in the present second embodiment is another method of the target vehicle speed increase determination calculation shown in FIG. 10 in the first embodiment described above. Other configurations are similar to the corresponding configurations of the first embodiment, wherefore detailed description of these configurations will not be repeated.

Figure 13:
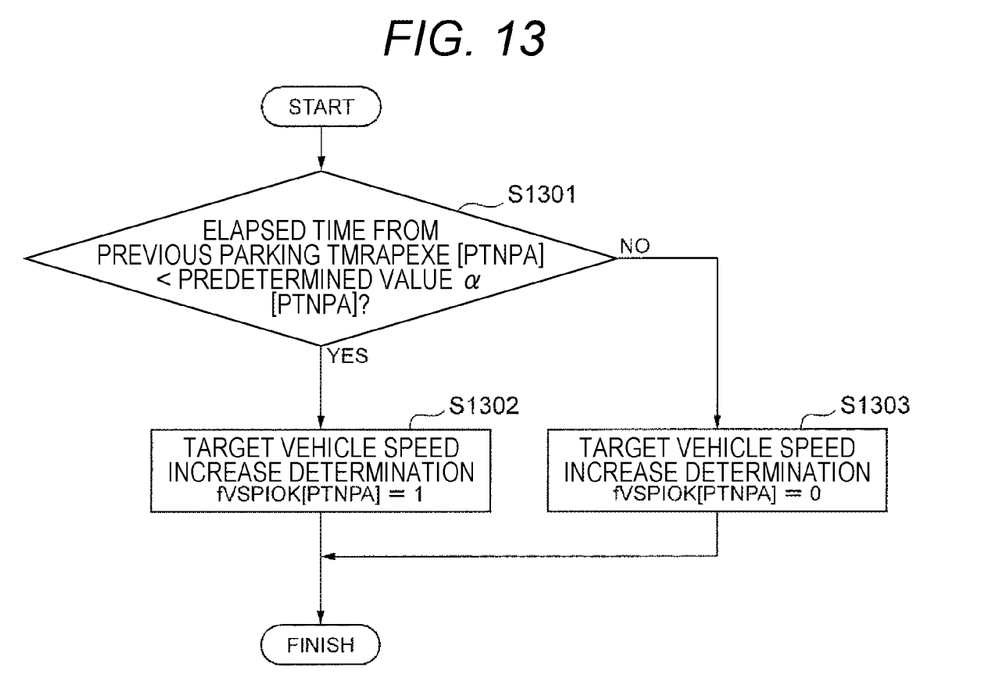
FIG. 13 is a flowchart schematically showing a target vehicle speed increase determination calculation process performed by a parking assistance device according to a second embodiment of the present invention.

As shown in FIG. 13, according to the present second embodiment, it is determined whether or not an elapsed time TMRAPEXE [PTNPA] from previous parking is shorter than a certain predetermined value α [PTNPA] (S1301). When it is determined that the elapsed time TMRAPEXE [PTNPA] is shorter than the predetermined value α [PTNPA], the target vehicle speed increase determination flag is set (i.e., the target vehicle speed increase determination fVSPIOK [PTNPA] is set to 1) (S1302). When it is determined that the elapsed time TMRAPEXE [PTNPA] is equal to or longer than the predetermined value α [PTNPA], the target vehicle speed increase determination flag is not set (i.e., the target vehicle speed increase determination fVSPIOK [PTNPA] is set to 0) (S1303). Note that the elapsed time TMRAPEXE [PTNPA] from previous parking, and the predetermined value α [PTNPA] for determination are herein set for each of the parking patterns PTNPA. More specifically, in the present second embodiment, it is considered that the driver is experienced in the automatic parking control when the elapsed time from previous parking is short. In this case, the upper limit vehicle speed (target vehicle speed upper limit) is raised to increase the vehicle speed of the corresponding vehicle during parking.

In this manner, inconvenience felt by the driver can be reduced similarly to the first embodiment.

Third Embodiment

A parking assistance device according to a third embodiment of the present invention will be next described with reference to FIG. 14. Described in the present third embodiment is also another method of the target vehicle speed increase determination calculation shown in FIG. 10 in the first embodiment described above. Other configurations are similar to the corresponding configurations of the first embodiment, wherefore detailed description of these configurations will not be repeated.

Figure 14:
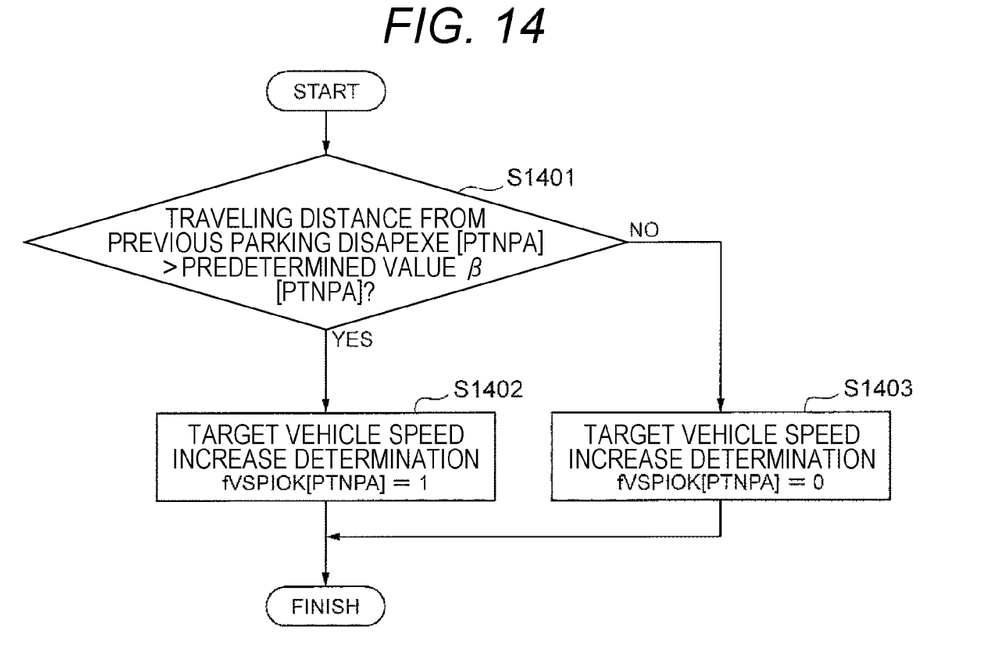
FIG. 14 is a flowchart schematically showing a target vehicle speed increase determination calculation process performed by a parking assistance device according to a third embodiment of the present invention.

As shown in FIG. 14, according to the present third embodiment, it is determined whether or not a traveling distance DISAPEXE [PTNPA] from previous parking is longer than a predetermined value β [PTNPA] (S1401). When it is determined that the traveling distance DISAPEXE [PTNPA] is longer than the predetermined value β [PTNPA], the target vehicle speed increase determination flag is set (i.e., the target vehicle speed increase determination fVSPIOK [PTNPA] is set to 1) (S1402). When it is determined that the traveling distance DISAPEXE [PTNPA] is equal to or shorter than the predetermined value Q [PTNPA], the target vehicle speed increase determination flag is not set (i.e., the target vehicle speed increase determination fVSPIOK [PTNPA] is set to 0) (S1403). Note that the traveling distance DISAPEXE [PTNPA] from previous parking, and the predetermined value β [PTNPA] for determination are herein set for each of the parking patterns PTNPA. More specifically, according to the present third embodiment, it is considered that the driver is experienced in driving when the travel distance from previous parking is long. In this case, the upper limit vehicle speed (target vehicle speed upper limit) is raised to increase the vehicle speed of the corresponding vehicle during parking.

In this manner, inconvenience felt by the driver can be reduced similarly to the first embodiment.

Fourth Embodiment

A parking assistance device according to a fourth embodiment of the present invention will be initially described with reference to FIG. 15. The present fourth embodiment is another method of the target vehicle speed upper limit calculation shown in FIG. 9 of the first embodiment described above. This method is different chiefly in that on-off determination of the brake SW is added. Other configurations are similar to the corresponding configurations of the first embodiment, wherefore detailed description of these configurations will not be repeated.

Figure 15:
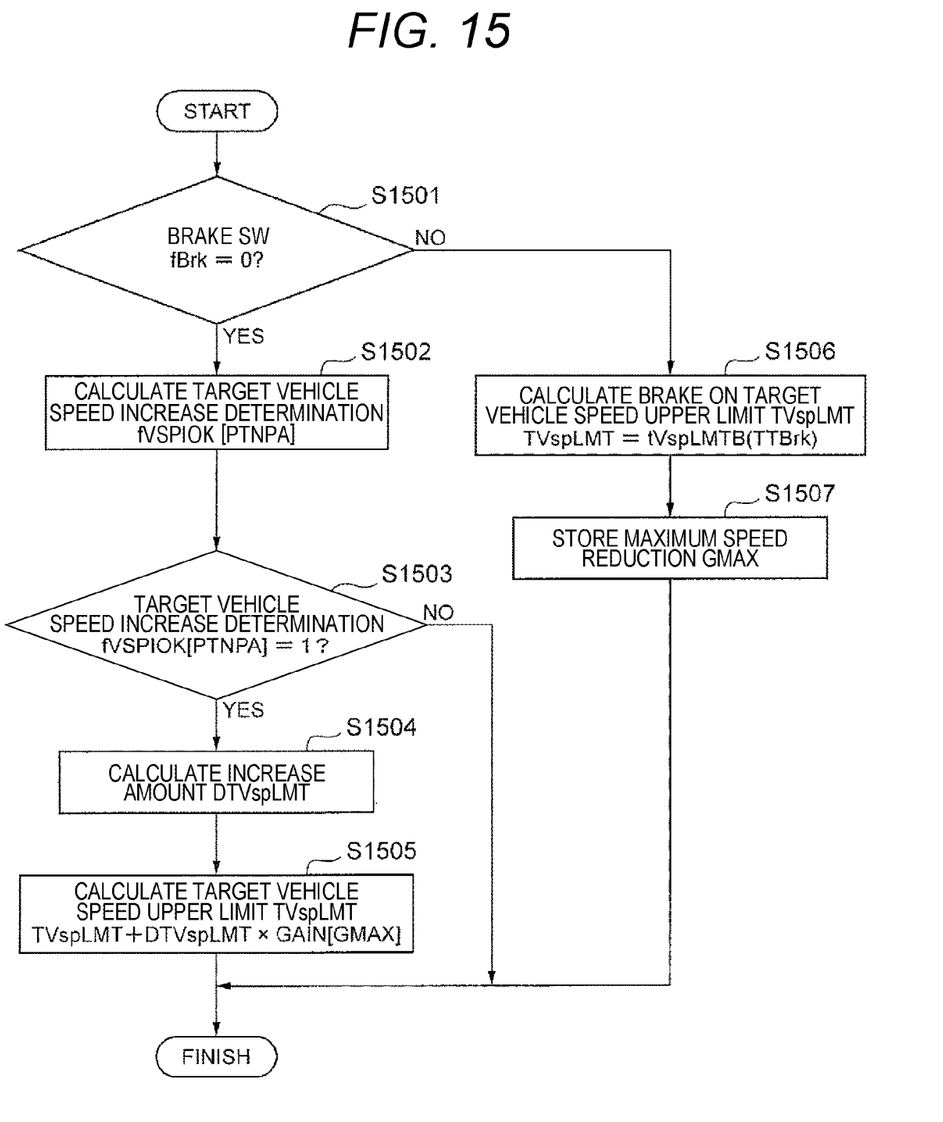
FIG. 15 is a flowchart schematically showing a target vehicle speed upper limit calculation process performed by a parking assistance device according to a fourth embodiment of the present invention.

As shown in FIG. 15, according to the present fourth embodiment, the on-off determination of the brake SW is made after a parking start to limit the upper limit of the vehicle speed (target vehicle speed upper limit) (i.e., correct the vehicle speed of the vehicle during parking to a lower speed) by the brake operation during parking, and then increase (return) the upper limit of the vehicle speed at the time of absence of the brake operation.

Specifically, on-off of the brake SW after the parking start is determined (S1501). When it is determined that the brake SW is turned on, a brake on target vehicle speed upper limit TVspLMT is calculated to limit the upper limit of the vehicle speed by the brake operation during parking (S1506). In addition, a maximum speed reduction GMAX at that time is stored (S1507). On the other hand, when the brake SW is off, the target vehicle speed increase determination fVSPIOK [PTNPA] is calculated (S1502). When the target vehicle speed increase is required based on a result of the calculation (S1503), an increase amount DTVspLMT is calculated (S1504). Thereafter, the increase amount DTVspLMT of the target vehicle speed upper limit TVspLMT in the absence of the brake operation is corrected (changed) using a correction GAIN [GMAX] corresponding to the maximum speed reduction GMAX to reset the target vehicle speed upper limit TVspLMT (S1505). In this example, the correction GAIN is set to a value which decreases as the maximum speed reduction GMAX increases (i.e., decreases the increase amount DTVspLMT of the vehicle speed of the vehicle) to correct an increase amount of the target vehicle speed upper limit after sudden speed reduction to a small amount, and correct an increase amount of the target vehicle speed upper limit after slow speed reduction to a large amount.

In this manner, inconvenience felt by the driver can be more precisely reduced.

As described above, according to the present embodiment, inconvenience felt by the driver experienced in automatic parking control after correction of the target vehicle speed of the vehicle to a lower speed at the start of automatic parking control, for example, can be reduced by increasing the vehicle speed of the vehicle during parking in accordance with a behavior during parking of the vehicle or from previous parking, such as the brake operation by the driver, the elapsed time from previous parking, the traveling distance from previous parking, and speed reduction during parking.

In the first to fourth embodiments, the increase in the vehicle speed including the target vehicle speed upper limit is determined based on the vehicle behavior such as the brake operation by the driver, the elapsed time from previous parking, the traveling distance from previous parking, and speed reduction during parking. Needless to say, the increase in the vehicle speed including the target vehicle speed upper limit may be determined based on a vehicle behavior other than the above examples.

The present invention is not limited to the first to fourth embodiments described above, but includes various modifications. For example, the first to fourth embodiments have been described in detail to help easy understanding of the present invention, and therefore are not necessarily required to include all the configurations described above. A part of a configuration of one embodiment may be replaced with a configuration of a different embodiment, and a configuration of a different embodiment may be added to a configuration of one embodiment. A part of a configuration of the respective embodiments may be deleted or replaced with a different configuration, or a different configuration may be added to a part of a configuration of the respective embodiments.

A part or all of the configurations, functions, processing units, processing means and the like described above may be designed as integrated circuits to implement these by hardware. The respective configurations, functions and the like described above may be executed by a processor which interprets a program for achieving the respective functions to implement the functions by software. Information such as a program, a table, and a file for achieving the respective functions may be placed in a memory, a hard disk, a storage device such as a solid state drive (SSD), or a recording medium such as an IC card, an SD card, and a DVD.

Control lines and information lines considered necessary for description are shown herein, and not all control lines and information lines provided in a product are necessarily shown. In practice, substantially all configurations may be considered to be mutually connected.

REFERENCE SIGNS LIST

1 automatic parking system
100 parking assistance device
100*i* input unit
100*c* computer
100*o* output unit
101 HMI device
101*a* parking start SW
102 external recognition input device
103 driving force control device
104 braking force control device
105 vehicle speed input device
106 shift control device
110 communication means

The invention claimed is:

1. A parking assistance device that controls a vehicle speed of a vehicle during parking to assist parking of the vehicle,
   characterized in that a vehicle speed of the vehicle during parking is increased in accordance with a behavior during parking or from previous parking of the vehicle,
   characterized in that the vehicle speed of the vehicle during parking is increased based on an elapsed time from previous parking, and
   characterized in that the vehicle speed of the vehicle during parking is increased when the elapsed time from previous parking is shorter than a predetermined value.

2. The parking assistance device according to claim 1, characterized in that a target vehicle speed upper limit of the vehicle speed of the vehicle during parking is increased and set in accordance with the behavior during parking or from previous parking of the vehicle.

3. The parking assistance device according to claim 1, characterized in that the vehicle speed of the vehicle during parking is increased based on presence or absence of a brake operation by a driver during previous parking.

4. The parking assistance device according to claim 3, characterized in that the vehicle speed of the vehicle during parking is increased when parking is continuously performed a predetermined number of times without the brake operation by the driver in a period until previous parking.

5. The parking assistance device according to claim 4, characterized in that the predetermined number of times is changed in accordance with a parking pattern.

6. The parking assistance device according to claim 1, characterized in that the vehicle speed of the vehicle during parking is increased based on a traveling distance from previous parking.

7. The parking assistance device according to claim 6, characterized in that the vehicle speed of the vehicle during parking is increased when the traveling distance from previous parking is longer than a predetermined value.

8. The parking assistance device according to claim 1, characterized in that an increase amount of the vehicle speed of the vehicle is changed according to a parking pattern.

9. The parking assistance device according to claim 1, characterized in that the vehicle speed of the vehicle during parking is increased in accordance with a behavior during parking or from previous parking of the vehicle in a case where the vehicle speed of the vehicle during parking has been corrected to a lower speed.

10. The parking assistance device according to claim 1, characterized in that an increase amount of the vehicle speed of the vehicle is changed in accordance with speed reduction during previous parking.

11. The parking assistance device according to claim 10, characterized in that the increase amount of the vehicle speed of the vehicle is reduced as the speed reduction during previous parking increases.

12. A parking assistance device that controls a vehicle speed of a vehicle during parking to assist parking of the vehicle,
characterized in that a vehicle speed of the vehicle during parking is increased in accordance with a behavior during parking or from previous parking of the vehicle,
characterized in that the vehicle speed of the vehicle during parking is increased based on a traveling distance from previous parking, and
characterized in that the vehicle speed of the vehicle during parking is increased when the traveling distance from previous parking is longer than a predetermined value.

\* \* \* \* \*